US006966663B2

(12) United States Patent
Wada et al.

(10) Patent No.: US 6,966,663 B2
(45) Date of Patent: Nov. 22, 2005

(54) AUTOMOTIVE INSTRUMENT

(75) Inventors: Toshiki Wada, Kariya (JP); Takaaki Muramatsu, Kariya (JP); Katsuhiro Kumazawa, Anjo (JP)

(73) Assignee: Denso Corporation, Kariya (JP)

( * ) Notice: Subject to any disclaimer, the term of this patent is extended or adjusted under 35 U.S.C. 154(b) by 188 days.

(21) Appl. No.: 10/681,375

(22) Filed: Oct. 9, 2003

(65) Prior Publication Data

US 2004/0125587 A1    Jul. 1, 2004

(30) Foreign Application Priority Data

Oct. 11, 2002    (JP)    .............................. 2002-298754

(51) Int. Cl.⁷ .............................................. G01D 11/28
(52) U.S. Cl. .......................... 362/29; 362/23; 362/489
(58) Field of Search ........................... 362/23, 29, 489, 362/464; 315/76, 77

(56) References Cited

U.S. PATENT DOCUMENTS 5,673,987 A * 10/1997 Futschik et al. .............. 362/23
6,621,471 B1 * 9/2003 Ozaki et al. .................... 345/4
6,663,249 B2 * 12/2003 Pan .............................. 362/23
2003/0043049 A1   3/2003 Wada et al.

FOREIGN PATENT DOCUMENTS

JP    A-H02-234857    9/1990

* cited by examiner

*Primary Examiner*—Thomas M. Sember
(74) *Attorney, Agent, or Firm*—Posz Law Group, PLC

(57) ABSTRACT

An automotive instrument includes a light transmission controller and a mode selecting switch. The controller controls light transmission of a light-controllable film according to a selected position of the mode selecting switch. The mode selecting switch has three positions: two manual mode positions and an automatic mode position. The manual mode positions are provided for adjusting the light transmission to a fixed level. The automatic mode position is provided for controlling the light transmission so that a dial plate maintains a predetermined level of visibility. The dial plate can be switched between different appearances. This switching can be performed during the vehicle is in operation based on the driver's preference.

8 Claims, 4 Drawing Sheets

US 6,966,663 B2

AUTOMOTIVE INSTRUMENT

CROSS REFERENCE TO RELATED APPLICATION

This application is based on and incorporates herein by reference Japanese Patent Application No. 2002-298754 filed on Oct. 11, 2002.

FIELD OF THE INVENTION

The present invention relates to an automotive instrument.

BACKGROUND OF THE INVENTION

In automotive instruments, various arrangements have been introduced to provide attractive appearances. For example, a display device proposed in JP-A-2-234857 uses an arrangement for controlling light transmission of a light-controllable member installed in front of a dial plate. This arrangement is effective for a blackface meter.

Other arrangements have been considered. For example, colored face instead of a black face has been already applied to dial plates. Furthermore, adding fixtures to the dial plate surface has been also considered. By adding lustrous metal texture to the dial plate surface, a luxurious and precise appearance can be added to the dial plate surface.

Although various attractive appearances of automotive instruments have been introduced, the appearances of those are not easily changeable based on the driver's preference. In the display device proposed in JP-A-2-234857, the device has different appearances depending on whether the vehicle is in operation. The light transmission of the light-controllable member is controlled to change the appearances. However, the appearances cannot be changed during the vehicle is in operation.

SUMMARY OF THE INVENTION

The present invention therefore has an objective to provide an automotive instrument, an appearance of which are changeable based on the driver's preference during a vehicle is in operation. An automotive instrument of the present invention includes a dial plate, a light-controllable member, a light transmission controller, and a mode selecting switch.

The dial plate includes marks, characters, and a pointer. The light controllable member is installed in front of the dial plate so that it covers the dial plate in view of a driver. The light transmission controller controls light transmission of the light controllable member. The mode selecting switch has a manual mode position and an automatic mode position.

When the switch is turned to the manual mode position, the light transmission is adjusted to a fixed level. In other words, the light transmission is adjusted to either a high level or a low level. When the switch is turned to the automatic mode position, the light transmission is controlled so that the dial plate maintains a predetermined level of visibility. In other words, the light transmission is adjusted to appropriate levels based on an illuminance level of ambient light so that a high level of visibility of the dial plate is maintained.

The dial plate can be switched between different appearances, one of them is that all elements and patterns are visible and another is that only the marks, the characters, and the pointers are visible. This switching can be performed during the vehicle is in operation based on the driver's preference.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
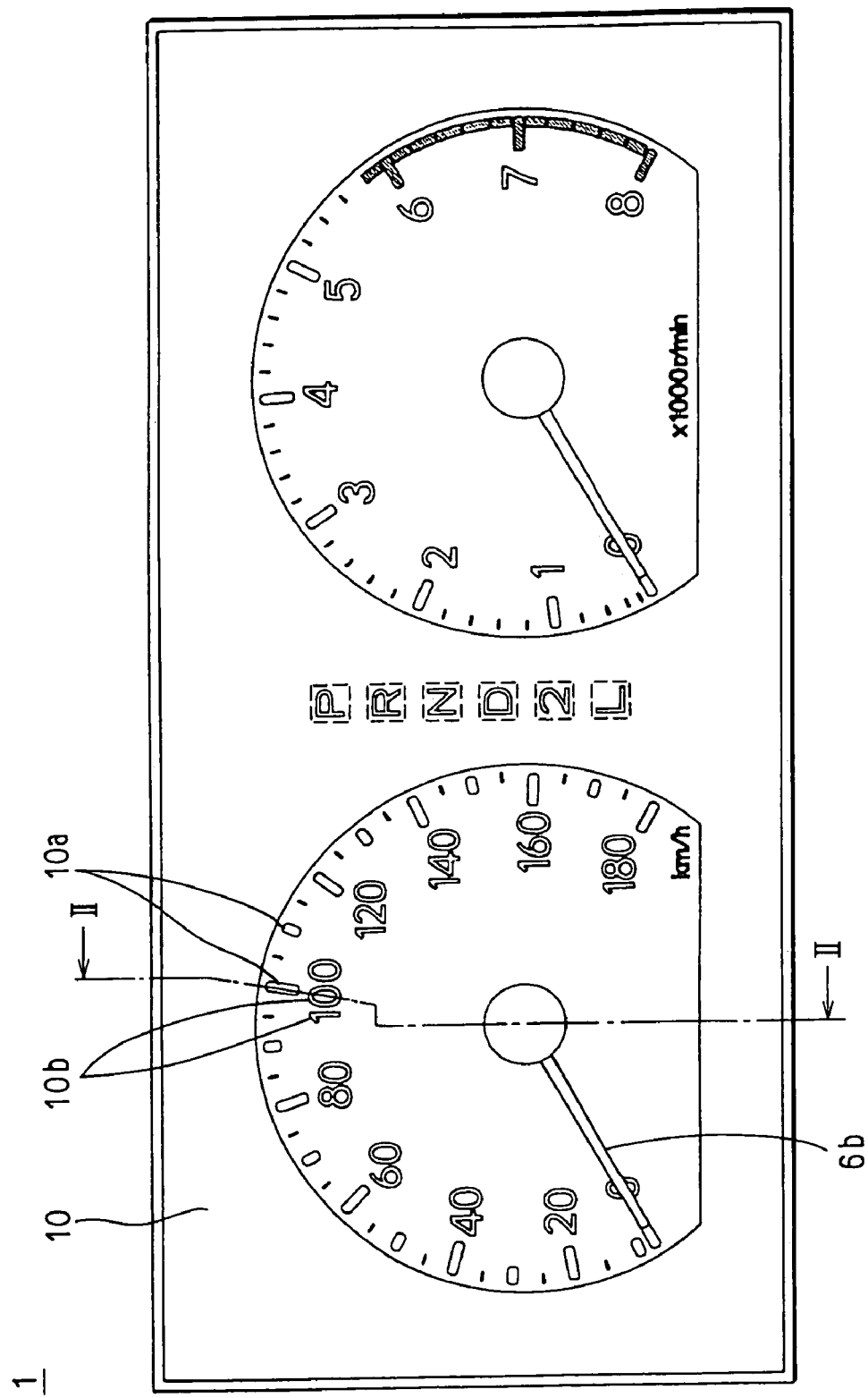
FIG. 1 a front view of a combination meter according to an embodiment of the present invention.
Figure 2:
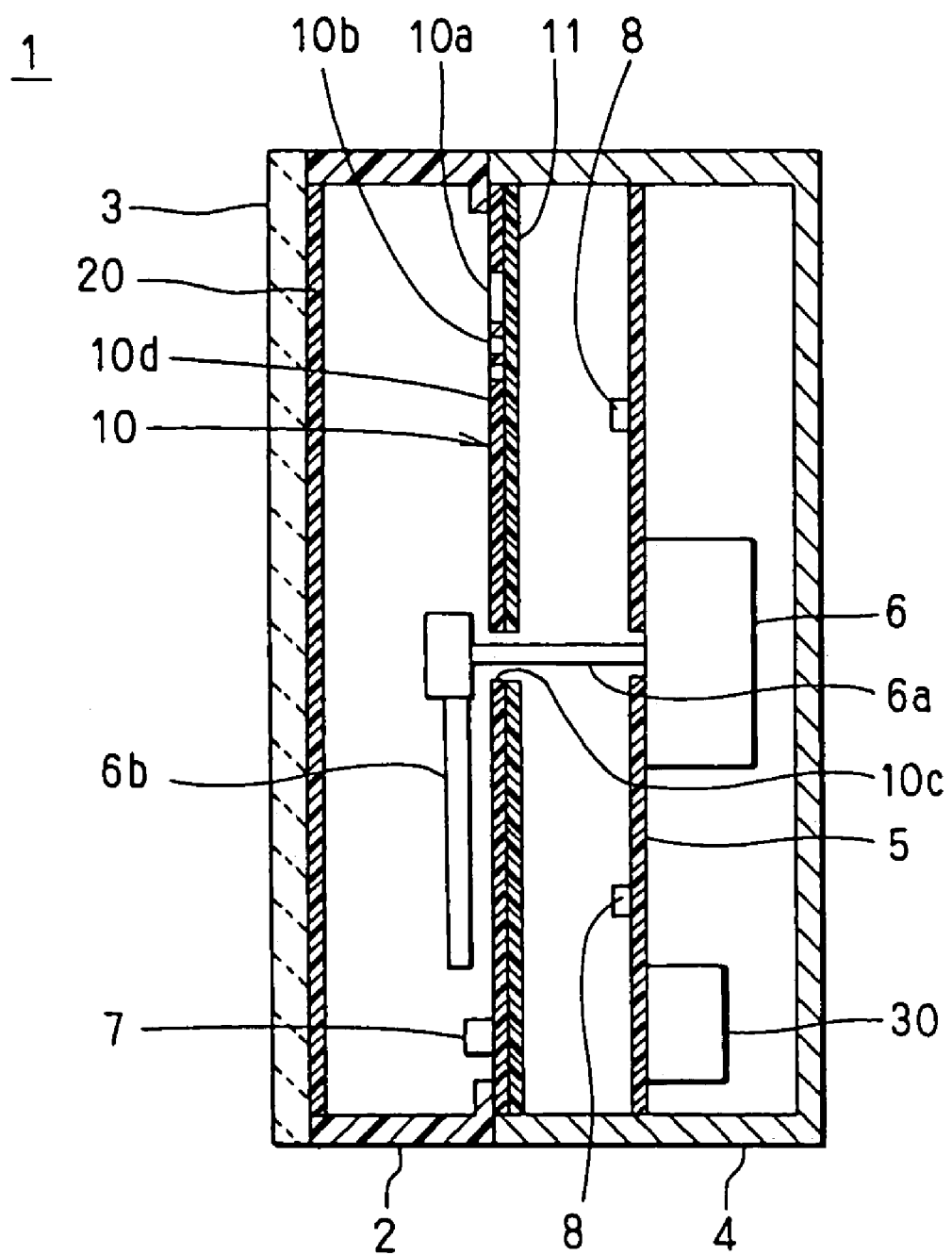
FIG. 2 is a cross-sectional view of the combination meter of FIG. 1 sectioned by line II—II.

The preferred embodiment of the present invention will be explained with reference to the accompanying drawings.

A combination meter 1 is installed in an interior of a vehicle more to the front than a driver's seat as to be visible from a driver. The combination meter 1 includes a dial plate on which various kinds of information are displayed. The dial plate 10 is made of a thin metal sheet, such as a thin aluminum sheet, and has marks 10a and characters 10b on its surface 10d. The marks 10a and characters 10b are pressed in designated shapes or formed in etching pits.

The dial plate surface 10d is lustrously finished by polishing and patterned with hairlines or fish scale patterns for providing an attractive appearance. An illuminance sensor 7 is mounted on the dial plate surface 10d for sensing the illuminance level on the dial plate surface 10d.

A transparent cover 3 made of a thin polycarbonate plate is fixed to a ring-shaped hood 2 in front of the dial plate 10, and the ring-shaped hood 2 is fix to a casing 4. A surface of the transparent cover 3 adjacent to the dial plate 10 is entirely covered with a light-controllable film 20 that changes the appearance of the dial plate 10.

Figure 4:
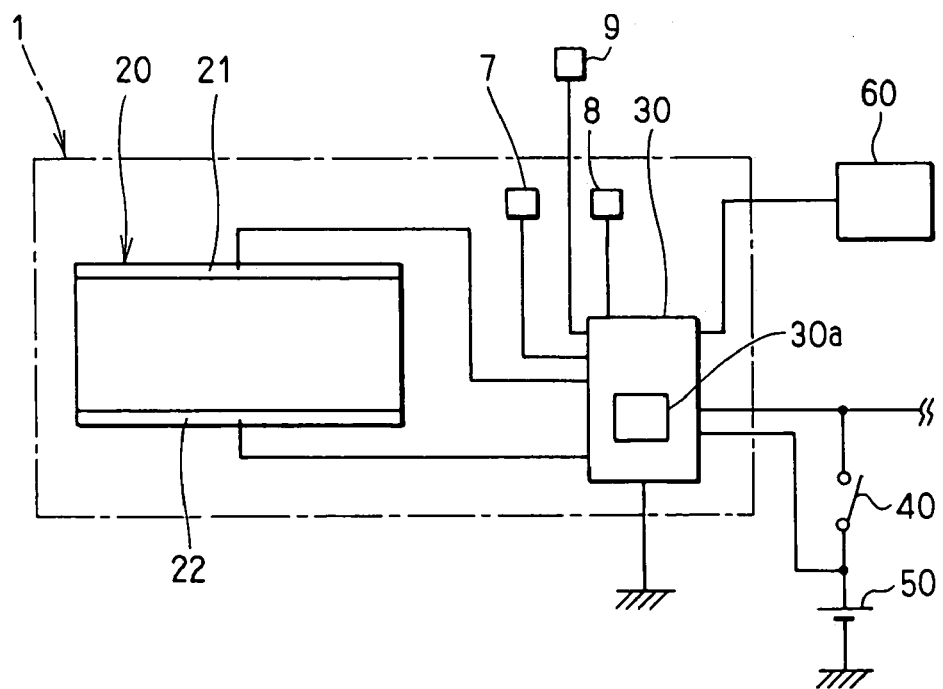
FIG. 4 is a block diagram of an electrical circuit for controlling a light-controllable film.

The light-controllable film 20 is a gel type electrochromic display (ECD), which is a mixture of an electrolyte and an electrochromic (EC) substance. A pair of electrodes 21, 22 is arranged at opposed edges of the film 20, as shown in FIG. 4. The light transmission is adjusted by controlling a voltage applied between the electrodes 21, 22. If the applied voltage E is zero volts, a large amount of light is transmitted, that is, the film 20 looks substantially transparent. The light transmission decreases as the applied voltage increases, and the film 20 becomes darker in color as sunglasses. When the maximum voltage Emax is applied, the light transmission is decreased to the lowest level and the film 20 becomes navy or black.

A light guiding plate 11 for focusing light emitted from a light emitting diode (LED) 8 to light the marks 10a and the characters 10b is fixed at the rear of the dial plate 10. The guiding plate 11 is made of a transparent or a semi-transparent resin, such as an acrylic resin.

A printed circuit board (PCB) 5 having electrical circuits of the combination meter 1 is arranged at the rear of the guiding plate 11. A movement 6 for rotating a shaft 6a by an angle based on a signal inputted form an external device is mounted on the PCB 5. One end of the shaft 6a is led to the front of the dial plate 10 via a center hole 10c and connected to a pointer 6b. The pointer 6 is a self-luminous pointer that emits light itself, such as a discharge tube, or a device that emits light when external light is guided to the device.

The LED 8 is mounted on the front side of the PCB 5, the side facing the light guiding plate 11, for lighting the dial plate 10. A light transmission controller 30, which is a hybrid-IC, for controlling a voltage applied to the light-controllable film 20 is mounted on the rear side of the PCB 5. A mode selecting switch 60 is connected to the controller 30 via a lead wire (not shown).

Figure 3:
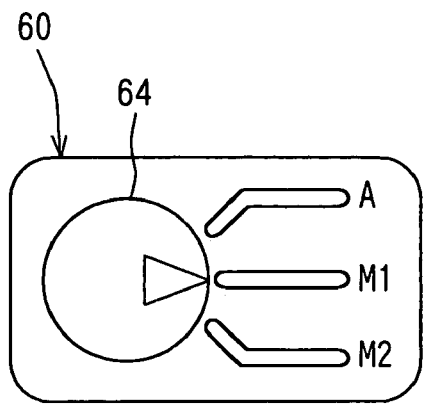
FIG. 3 is a front view of a mode selecting switch of the combination meter.

The mode selecting switch 60 is a rotary switch shown in FIG. 3 having three positions: M1 and M2 positions for manual modes and an A position for an automatic mode. The driver can select a position by turning a knob 64 to a respective position. The position switch 60 is installed in an operation panel (not shown) in which various operation switches are arranged located more to the front than the drive's seat.

When the M1 position is selected by the driver, a pointer on the knob 64 is turned to the M1 position as shown in FIG. 3. The controller 30 controls the voltage applied to the light-controllable film 20 to the maximum voltage Emax. The maximum voltage Emax is applied to the light-controllable film 20, and the light transmission of the light controllable film 20 is adjusted to the minimum level. When the switch 60 is turned to the M2 position and the controller 30 control the voltage to the minimum voltage Emin, which is nearly equal to zero volts, the light transmission is adjusted to the maximum level.

When the switch 60 is turned to the A position, the controller 3 controls the voltage for maintaining an illuminance level on the dial plate surface 10d at an appropriate level. The controller 3 controls the voltage based on signals received from the illuminance sensor 7 and an illuminance sensor 9 for adjusting the light transmission. By this control, the visibility of the dial plate 10 is maintained at an appropriate level. The marks 10a, the characters 10b, and the pointer 6b are easily recognized by the driver, and no reflected images are produced on a front windshield that may decrease the forward visibility of the driver. The illuminance sensor 9 is installed in a position appropriate for sensing the illuminance in an interior of the vehicle, such as on a dashboard, a rear tray, or a headrest of the driver's seat.

Referring to FIG. 4, a battery 50 is connected to the controller 30 for continuously supplying power to the controller 30. Furthermore, the mode selecting switch 60 and the illuminance sensors 7, 9 are connected to the controller 30. The controller 30 is connected to an ignition switch (IG SW) 40 for detecting on-off conditions of the IG SW 40 and the light-controllable film 20 for applying a voltage to the film 20.

Figure 5:
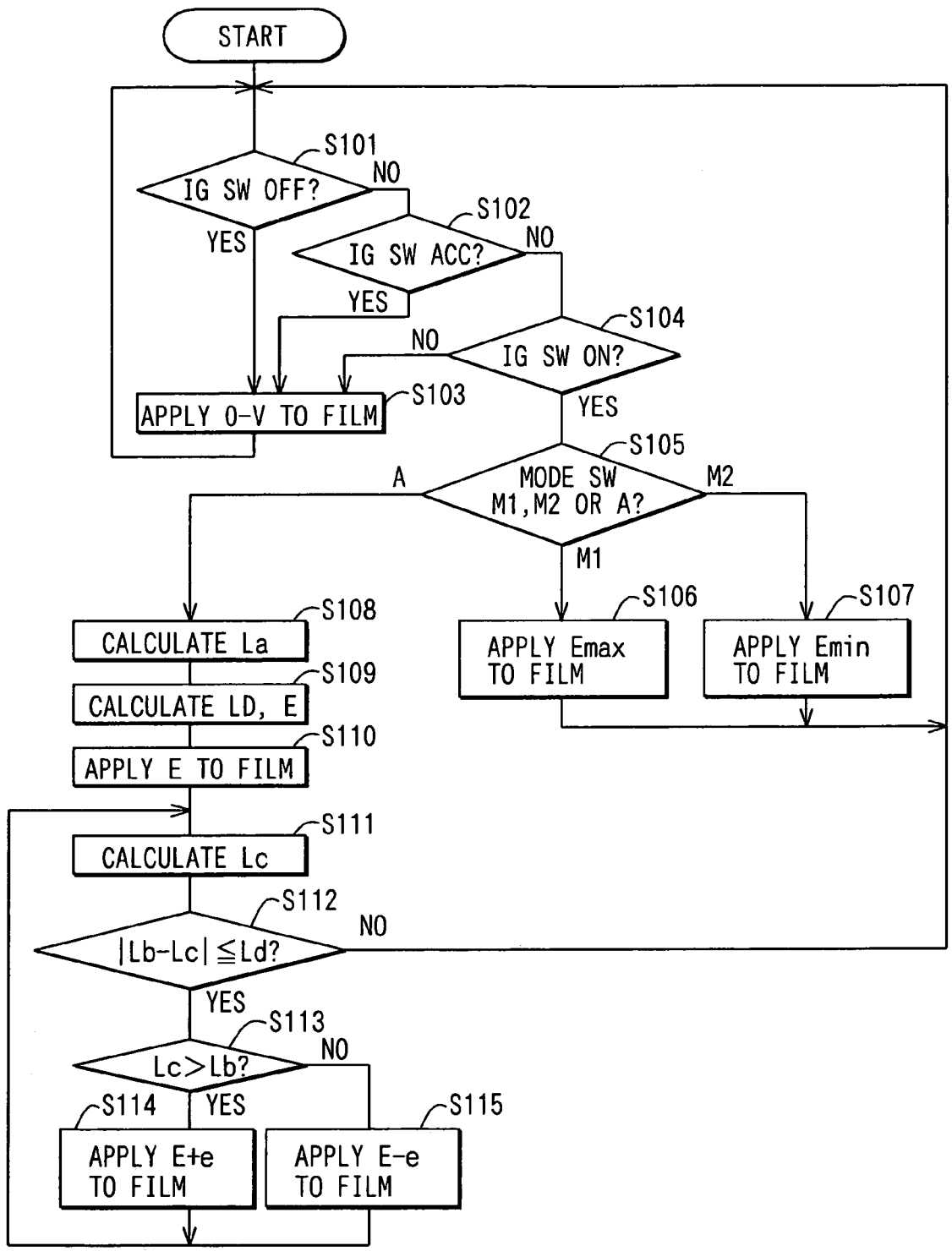
FIG. 5 is a flowchart of a voltage application control to the light-controllable film performed by a controller.

The controller 30 performs control on voltage application to the film 20 as shown in FIG. 5. It is determined whether the IG SW 40 is turned to an OFF position (S101). If the IG SW 40 is turned to the OFF position, a 0-volt voltage is applied to the film 20 (S103). If the IG SW 40 is turned to the ON position, it is determined whether IG SW 40 is turned the ACC position (S102). If the IG SW 40 is turned to the ACC position, a 0-volt voltage is applied to the film 20 (S103). If the IG SW 40 is not turned to the ACC position, it is determined whether the IG SW is turned to the ON position (S104). If the IG SW 40 is not tuned to the ON position, a 0-volt voltage is applied to the film 20 (S103).

If the IG SW 40 is turned to the ON position, the position of the mode selecting switch 60 is determined (S105). If the PS switch 60 is at the M1 position, the maximum voltage Emax is applied to the film 20 (S106). As a result, the light transmission of the film 20 is adjusted to the minimum level, and the film 20 becomes navy blue or black. When the film 20 is in blue or black, the patterns on the dial plate surface 10d become invisible. Therefore, only the marks 10a, the characters 10b, and the pointer 6b are visible in navy blue or black.

If the PS switch 60 is turned to the M2 position, the minimum voltage Emin is applied to the film 20 (S107). As a result, the light transmission of the film 20 is adjusted to the maximum level, and the film 20 becomes almost transparent. When the film 20 is in transparent, the patterns on the dial plate surface 10b become highly visible.

If the PS switch 60 is turned to the A position, an illuminance level La in an interior of the vehicle is calculated based on a signal outputted from the illuminance sensor (S108). A target illuminance level Lb and an application voltage E that is applied to the film 20 are determined according to the calculated illuminance level La using a map (S109).

The map contains settings of the target illuminance level Lb and the application voltage E relative to the interior illuminance level La for providing stable and appropriate illumination of the dial plate 10. More specifically, the target illuminance level Lb and the application voltage E are set so that they become higher as the interior illuminance level becomes higher. The map is stored in a storage 30a included in the controller 30.

The application voltage E determined at S109 is applied to the film 20 (S110). An illuminance level Lc of the dial plate 10 after the voltage E is applied to the film 20 is calculated based on a signal outputted from the illuminance sensor 7 (S111). It is determined whether an absolute value of the subtraction (|Lb−Lc|) between the illuminance level Lb and the illuminance level Lc is equal to or less than a threshold illuminance level Ld (S112). The threshold illuminance level Ld is set so that the appropriate visibility of the dial plate 10 is provided at the illuminance level Ld.

If the absolute value is equal or less than the illuminance level Ld, it is determined whether the illuminance level Lc is higher than the illuminance level Lb (S113). If the illuminance level Lc is higher, the application voltage E is increased by a voltage e to decrease the illuminance level, Lc so that the dial plate 10 looks dimmer to the driver (S114). These steps (S112, S113, S114) are repeated until the absolute value (|Lb−Lc|) becomes equal to or less than the illuminance level Ld.

If the illuminance level Lc is lower, the application voltage E is decreased by the voltage e to increase the illuminance level Lc so that the dial plate 10 looks brighter to the driver (S115). These steps (S112, S113, S115) are repeated until the absolute value (|Lb−Lc|) becomes equal to or less than the illuminance level Ld.

The controller 30 controls the light transmission of the film 20 according to the selected position of the mode selecting switch 60. The three modes can be selected by the mode selecting switch 60: manual modes M1, M2, and auto mode A.

In manual mode M1, the light transmission of the film 20 is adjusted to a fixed level so that all elements of the dial plate 10 including patterns on the dial plate surface 10d are visible. In manual mode M2, the light transmission is adjusted to a fixed level so that only the pointer 6b, the marks 10a, and the characters 10b are visible. In auto mode A, the light transmission is automatically adjusted so that a predetermined level of visibility of the dial plate 10 is provided.

The dial plate 110 can be switched between different appearances. One of the appearances is that the pointer 6b, the marks 1a, the characters 10b, and the patterns on the dial plate surface 10d are visible, and another is that only the pointer 6b, the marks 10a, and the characters 10b are visible. This switching can be performed during the vehicle is in operation based on the driver's preference.

The ECD is used for the light-controllable film 20. Therefore, the light transmission of the film 20 is easily adjusted by controlling the voltage applied across the electrodes 21, 22. In other words, the appearance of the combination meter 1 is easily switchable.

The present invention should not be limited to the embodiment previously discussed and shown in the figures, but may be implemented in various ways without departing from the spirit of the invention. A solid-state thin-film ECD may be used for the light-controllable film 20. Other types of switches, such as a push-button switch, can be used for the mode selecting switch 60. The mode selecting switch 60 may be installed in a place convenient for the driver, for instance, it may be installed on a steering column.

The mode selecting switch 60 may have different mode settings. Other types of light sources may be used for lighting the dial plate 10, the marks 10a, and the characters 10b. For example, light bulbs or discharge lamps can be used. The dial plate 10 may be made of resin with metal plating or coating on its surface.

What is claimed is:

1. An automotive instrument comprising:
   a dial plate;
   a light-controllable member arranged in front of the dial plate;
   a light transmission control means for controlling light transmission of the light-controllable member; and
   a mode selecting switch for selecting a mode of light transmission control performed by the light transmission control means, wherein,
   the mode selecting switch includes a manual mode position and an automatic mode position,
   the light transmission control means adjusts the light transmission of the light-controllable member to a fixed level when the mode selecting switch is turned to the manual mode position, and controls the light transmission so that the dial plate maintains a predetermined level of visibility when the mode selecting switch is turned to the automatic mode position.

2. The automotive instrument according to claim 1, wherein the mode selecting switch further comprises at least one more manual mode position.

3. The automotive instrument according to claim 1, wherein the mode selecting switch further comprises at least one more automatic mode position.

4. The automotive instrument according to claim 1, wherein the dial plate has a lustrous surface.

5. The automotive instrument according to claim 1, wherein the light-controllable member is an electrochromic display.

6. The automotive instrument according to claim 1, wherein the light-controllable member is a solid-state thin-film electrochromic display.

7. The automotive instrument according to claim 1, further comprising an illuminance sensing means for sensing an illuminance level on a dial plate surface, wherein the light transmission control means controls the light transmission of the light-controllable member based on the illuminance level when the mode selecting switch is turned to the automatic mode position.

8. The automotive instrument according to claim 7, further comprising an illuminance sensing means for sensing an illuminance level in an interior of a vehicle, wherein:
   the light transmission control means determines a target illuminance level on the dial plate surface based on the illuminance level in the interior of the vehicle when the mode selecting switch is turned to the automatic mode position; and
   the light transmission control means controls the light transmission of the light-controllable member based on the target illuminance level and the illuminance level on the dial plate surface.

* * * * *